Patented Feb. 10, 1953

2,628,178

UNITED STATES PATENT OFFICE 2,628,178

OXYGENATED POLYMERIZABLE ACRYLIC ACID TYPE ESTERS AND METHODS OF PREPARING AND POLYMERIZING THE SAME

Robert E. Burnett and Birger W. Nordlander, Schenectady, N. Y., assignors to General Electric Company, a corporation of New York No Drawing. Application July 29, 1950, Serial No. 176,768

32 Claims. (Cl. 154—43)

1

The present invention relates to the preparation of certain polymerizable compositions and methods of polymerizing such compositions. More particularly, the invention is concerned with oxygenated compositions of matter obtained by oxygenating a compound corresponding to the general formula:

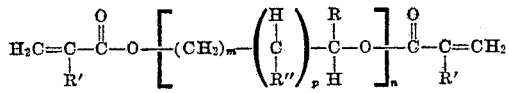

where R is a member selected from the class consisting of hydrogen, —CH₃, —C₂H₅, —CH₂OH, and

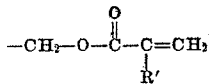

radicals, R' is a member selected from the class consisting of hydrogen, chlorine and the methyl and ethyl radicals, R'' is a member selected from the class consisting of hydrogen, —OH radical, and

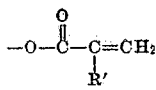

radical; $m$ is an integer equal to at least 1, e. g., from 1 to 8, or higher, for instance, from 1 to 4, inclusive; $n$ is an integer equal to at least 2, for example, from 2 to 20 or more, and $p$ is one of the following: 0, 1.

One of the objects of this invention is to provide a method for preparing oxygenated compositions of matter obtained by oxygenating compounds corresponding to the above-identified general formula.

Another object of the invention is to polymerize rapidly at room temperature the above-identified oxygenated polymerizable compositions to give products possessing properties eminently suitable for many applications.

Other objects of the invention will be apparent from a consideration of the following specification and the appended claims.

Heretofore, it has been known that certain polymerizable monomers can be stabilized against polymerization under normal or elevated temperature conditions by passing air or oxygen through the monomer. Thus, in British Patent 573,175 it is suggested that the polymerization of methacrylic acid and its polymerizable derivatives, such as its esters, etc., can be inhibited by maintaining the acid or its derivative in intimate contact with gaseous oxygen. This oxygen may be in the form of pure oxygen or may be in the form of a stream of air which has been found to contain sufficient oxygen to inhibit the polymerization.

In another instance, in U. S. Patent 2,493,343, it is proposed that polymerizable mixtures, particularly mixtures containing styrene, may be stabilized against polymerization during storage periods so that there is no undesirable gelling or polymerization of the monomeric material prior to its subsequent use in regular molding or casting operations, by bubbling pure or concentrated gaseous oxygen through the monomer so as to cause adequate diffusion of the oxygen through the monomer, or mixture of the monomer with other copolymerizable materials such as, for example, mixtures of styrene, diethylene glycol, and maleic anhydride.

In both of the foregoing patents, after bubbling or passage of the oxygen through the polymerizable monomer, no unusual difference in properties was noted in the monomer than was present in the monomer prior to treatment with the oxygen. U. S. Patent 2,493,343 points out that solid resins could be cast from the oxygen-treated monomeric mixtures at the same rate as from untreated solutions. Also, we have found that the treatment of acrylic acid derivatives, such as, for example, methyl methacrylate, butyl and styrene acrylate, did not effect any change in their properties since polymerization after treatment of the monomers with the oxygen gave results which were essentially the same as though the monomer had not been treated beforehand with the oxygen. Moreover, aeration of such polymerizable materials as well as similar polymerizable compositions changes its polymerization properties, the rapid polymerization rate normally obtained shortly after the addition of an accelerator to the said polymerizable material being no longer obtainable after aeration.

We have now discovered unexpectedly that a certain class of monomers hereinafter for brevity referred to as "starting material" can be oxygenated to give entirely new compositions of matter whose properties are materially different from the properties of the starting material prior to treatment with oxygen. More particularly, we have discovered that the oxygenation of monomeric materials corresponding to the general formula:

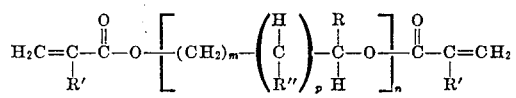

where R, R', R'', m, n and p have the meanings given above, gives novel compositions of matter which unexpectedly polymerize very rapidly to the solid state by themselves without the use of any added conventional polymerization catalyst, when oxygen is excluded from the oxygenated derivative of the above-identified starting material. For purposes of brevity, the above-described oxygenated compositions will hereinafter be referred to as "anaerobic monomers" because polymerization can occur in the absence of air.

It will be apparent that one prerequisite of the monomeric starting materials employed in the practice of our invention is that it should contain at least two terminal $CH_2=C<$ groupings. This alone, however, is not a sufficient prerequisite for yielding the anaerobic monomer of our invention.

For example, oxygenation of diallyl phthalate with two such groupings, under the conditions which are specified for making the products of our invention, will not yield a composition having the properties of an anaerobic monomer. We have found that in addition to the presence of at least two terminal $CH_2=C<$ groupings, it is also essential that there be present in the monomer ether linkages as exemplified by the above-identified general formula. In the production of the anaerobic monomers which fall within the scope of this invention, compounds corresponding to the above general formula, where $n$ is equal to 1, are not equivalent to those compounds having ether linkages where $n$ is equal to 2 or more. This will be clearly brought out in the examples which follow.

Among the starting materials corresponding to the general formula mentioned above which may be employed in the practice of our invention may be mentioned, for instance, diethylene glycol dimethacrylate, triethylene glycol dimethacrylate, tetraethylene glycol dimethacrylate, dipropylene glycol dimethacrylate, polyethylene glycol dimethacrylate, di-(pentamethylene glycol) dimethacrylate, tetraethylene glycol diacrylate, tetraethylene glycol di-(chloroacrylate), diglycerol diacrylate, diglycerol tetramethacrylate, etc.

In preparing the anaerobic monomer, it has been found that several methods may be employed and that any one of several forms of oxygen, e. g., pure oxygen, air, ozone, mixtures of ozone and air or oxygen, etc. may be used. For purposes of brevity the term "oxygen" referred to hereinafter, unless otherwise specified, will apply to such forms. The supply of oxygen should be generous and should be distributed in a finely divided state throughout the monomeric fluid undergoing treatment. A deficiency in the amount of oxygen may cause the product to polymerize undesirably during the preparation of the anaerobic monomer. In our invention the oxygen serves a two-fold function during the preparation step. The primary function is to effect an oxygenation of the polymerizable monomer to cause a new oxygenated product or anaerobic monomer to form, possessing entirely different properties from those disclosed or taught in the prior art. The uniqueness and importance of these properties will become more apparent by the results described in the examples below. While oxygen is required in order to effect conversion of the starting material to the anaerobic monomer, liberal excess over that required for this purpose is generally desirable in order that the reaction product be prevented from undergoing premature polymerization.

The more effectively the oxygen gas can be made to distribute uniformly in the liquid in the form of minute bubbles, so as to obtain an intimate contact of the oxygen gas with the starting fluid material, the more efficiently it will prevent polymerization during preparation and the more readily will oxygenation occur. Such a distribution of the oxygen can best be achieved by means of a conventional stirrer rotating at a speed of about 500–1000 R. P. M. However, when small quantities of the anaerobic monomer are to be made, a direct, brisk current of oxygen injected into the starting material by means of a small nozzle may prove to be adequate, provided the oxygen is thoroughly dispersed throughout the liquid.

The temperature at which oxygenation of the monomeric compound takes place may be varied within certain desirable limits ranging, for example, from below room temperature to as high as, for instance, 90° C. It has been found that in using air or oxygen, the attainment of a sufficiently oxygenated monomer or anaerobic monomer having a desirable polymerization rate when oxygen is excluded, can be attained within a reasonable time when the temperature is maintained around 50° to 85° C., for example, from about 60° to 80° C. When ozone is used, oxygenation proceeds rapidly at room temperatures to give a product comparable to that obtained by oxygenation with air or oxygen at elevated temperatures. If too high a temperature is employed during the oxygenation step, the system may become uncontrollable so that gelation of the reaction mixture usually occurs. If too low temperatures are employed, the process of oxygenation may become slow. We have found that temperatures of from about 20° to 85° C. give rapid conversion of the starting material to an anaerobic monomer while at the same time maintaining adequate control over the oxygenation reaction.

While an anaerobic monomer may be prepared simply by properly bubbling oxygen through the starting material at the temperatures described above, the time required to produce the desired product may under some circumstances become undesirably long if small amounts of substances acting as oxygen inhibitors are present either as impurities by chance or as additives by choice in the starting material. Such substances are frequently present in commercial grades of polymerizable materials to inhibit polymerization of such materials. When these inhibitors are encountered during the oxygenation step, longer times are generally required to effect oxygenation of the starting material to the anaerobic monomer stage. As a matter of fact, it has been found that in many cases periods of time as long as 10 hours or more may elapse during which no oxygenation will occur due to the presence of such inhibitors as quinone, hydroquinone, picric acid, pyrogallol, etc., usually added in very small amounts to polymerizable monomers to prevent their polymerization during either storage or transit.

Unexpectedly, we have additionally discovered that the effects of such inhibitors may be minimized and this inhibition period may be substantially reduced or even eliminated by the addition of a small amount of a peroxide compound, preferably an organic peroxide. After addition of the peroxide, reaction can be initiated almost as soon as the starting material is subjected to oxygenation. Several such peroxides have proved beneficial in this respect. Among these may be mentioned, for instance, benzoyl peroxide, tertiary butyl perbenzoate, di-tertiary butyl diperphthalate, tertiary butyl hydroperoxide, etc. These peroxides do not seem to vary greatly in their effectiveness in eliminating the inhibition period when used in connection with, for example, tetraethylene glycol dimethacrylate. The concentrations of such peroxides may be of the order of from about 0.01 to 0.5% or more by weight, more particularly, around 0.1%, by weight. Little added benefit appears to result in this respect by using larger amounts of these peroxides.

Instead of adding the organic peroxide as a promoter of oxygenation, it has also been found that the same effect can be produced by incorporating in the starting material a small amount, for example, about 0.5 to 1.5% or more of an anaerobic monomer or oxygenated end product obtained from a previous run solely for the purpose of promoting oxygenation. Although, as commonly known, many peroxides may initiate the polymerization of polymerizable monomers, it should be clearly understood that the small amounts of peroxides added for the reasons cited above do not function to any appreciable extent as initiators of polymerization, but act primarily as promoters of oxygenation. This is shown by the fact that the promoter is unable in the concentrations described above to cause the non-oxygenated starting material to polymerize at room temperature at a rate remotely resembling the rate of polymerization exhibited by the anaerobic monomer.

The time required to produce the anaerobic monomer varies with the type of starting material used, temperature employed during oxygenation, the use of promoters of oxygenation and the concentration of such promoters, etc. In general, we have found that from about 0.5 to 6 to 12 hours are sufficient under optimum conditions to effect adequate oxygenation of the starting monomer to give an anaerobic monomer having the desired properties of polymerizing rapidly when oxygen is excluded from the anaerobic monomer. The examples below will show the variety of conditions which can be employed and the time required for arriving at the stages described. It will, of course, be understood by those skilled in the art that we do not intend to be limited to these conditions as it will be apparent to such persons that longer or shorter times, or higher or lower temperatures, may also be used without departing from the scope of the invention.

The standards by which an anaerobic monomer may be judged suitable for practical use will vary with the type of application involved. For most applications it would appear that an anaerobic monomer may be considered to be of practical usefulness if by the oxygenation process it has been made to acquire the property of undergoing polymerization in the absence of air at room temperature at such a rate that the gelation point, determined on a sample placed between two glass slides in diffused light, is reached between 15 minutes to one hour. For some applications, however, it might be possible to use a product with a gelation time as low as five minutes.

One method which has been found helpful in estimating gelation time comprises placing a couple of drops of the oxygenated monomer to be tested for polymerizability on a standard 1-inch wide microscope slide. By placing on this slide at right angles another slide of the same kind and gently pressing it down the sample is spread out over an area of 1 sq. in. from which air has been effectively excluded. This assembly is kept at about 25° C. in a horizontal position in diffused light and examined from time to time to determine when the film commences to solidify or set. This point is reached when the upper slide first refuses to slip easily over the other resting on the table. Care should be taken to move the upper slide only very slightly each time since air otherwise would be introduced and retard the polymerization. The gelation time is taken as the time elapsing from the moment the assembly is made to the point when the upper slide cannot be freely moved over the lower slide. The gelation times described in the examples below were determined by this method.

Another test to be applied for determination as to when a suitably oxygenated anaerobic monomer has been obtained comprises determining the active oxygen content of the oxygenated product. Generally, we have found that the amount of introduced active oxygen introduced into the starting material is preferably from about 0.1 to 1.5%. A method for analyzing for active oxygen content which has been found helpful and which was employed in the following examples comprises taking a small sample, about 0.1 to 0.5 gram of the oxygenated monomer, weighing it in a small glass flask to which is added about 10 ml. glacial acetic acid. A pellet of Dry Ice about the size of a large pea is placed in the solution to dispel air. When about one-half the Dry Ice has evaporated, 1 ml. of a saturated aqueous solution of potassium iodide is added and the flask swirled to dissolve the ingredients. A loosely fitting cork is placed in the flask to retain the inert atmosphere and the mixture is heated for about 15 minutes in a 60° C. oven. Immediately after removing the flask from the oven, 10 ml. water is added to prevent interference of air. The warm solution is promptly titrated with 0.1 N sodium thiosulfate until the color of the iodine just disappears. Starch indicator should not be added. The active oxygen content is obtained by means of the formula:

$$\frac{ml^{N/10} Na_2S_2O_3 \times 0.8}{\text{Weight sample}} = \% \text{ active oxygen}$$

Since the viscosity of the oxygenated monomer is somewhat greater than the unoxygenated starting monomer, it is possible to use viscosity measurements as a convenient means of control of the oxygenation process during the preparation of the anaerobic monomer. For a product made, for example, from tetraethylene glycol dimethacrylate, it has been found that the practical useful material prepared in accordance with our invention will yield a viscosity in the final product which will be from about 2 to 5 times that of the starting material. Ordinary viscosity measurement procedures can be employed provided (a) that the sample taken be spread out in a sufficiently thin layer (in any flat bottomed flask) so that oxygen will diffuse into the sample at an adequate rate to provide sufficient aeration to prevent polymerization and (b) that the determination be made rapidly. Handling the sample in this manner insures that it will not change to any extent until the test has been completed. The sample is promptly brought to 25° C. by immersing the flask in a water bath. The test sample is drawn into an ordinary 1 ml. volumetric pipette and, without further delay, is allowed to flow out by gravity while the pipette is held in a vertical position with its tip out of the liquid. The viscosity in arbitrary units is taken as the time (seconds) for the liquid to drain from the calibration mark to the bottom of the bulb.

The pipette employed for testing in the following examples was calibrated against solutions of known viscosity to give the following comparative results:

| Pipette Reading (Sec. @ 25° C.) | Viscosity (Centipoises) |
|---|---|
| 10 | 6.5 |
| 20 | 15.0 |
| 30 | 22.0 |
| 100 | 57.0 |

The oxygen employed is most readily supplied directly from the atmosphere. However, pure concentrated gaseous oxygen is very effective. The best method of maintaining distribution of the gas in the polymerizable mixture seems to involve continuous liberation of fine bubbles into the bottom of the container in such a manner that the bubbles will gradually rise through the liquid. Uniform distribution is further assisted by subjecting the mixture simultaneously to vigorous agitation. After it has been determined that adequate oxygenation of the polymerizable composition has taken place to give a suitable anaerobic monomer, the anaerobic monomer is cooled to room temperature while still maintaining the oxygen flow. This reduction in temperature to room temperature is carried out as rapidly as possible. As soon as room temperature has been reached, the oxygen flow is terminated and a brisk current of air substituted for it. This must be maintained at all times during storage up to the time the material is to be used if autogenous polymerization due to exclusion of oxygen from the center of the anaerobic monomer is to be avoided during this period.

In order that those skilled in the art may better understand the present invention, the following examples are given by way of illustration and not by way of limitation. All parts are by weight.

EXAMPLE 1

Ten parts of tetraethylene glycol dimethacrylate

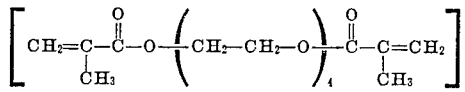

with no promoter added was placed in an open cylindrical vessel fitted with an oxygen delivery tube extending to the bottom of the vessel. After a brisk current of pure oxygen had been established through the monomer, the vessel was heated by mounting it in the neck of a flask containing boiling carbon tetrachloride (B. P. 77° C.). The course of the reaction was followed by measuring the active oxygen content, viscosity and gelation time on samples withdrawn from time to time. The results of these measurements are given in Table I below.

*Table I*

| Sample No. | Time of Oxygenation at 77° C. (Hrs.) | Percent Action Oxygen | Viscosity at 25° C. (Sec.) | Gelation Time at 25° C. (Hours) |
|---|---|---|---|---|
| 1 | 0.0 | 0.002 | 20.6 | Greater than 22. |
| 2 | 1.0 | 0.02 | | About 22. |
| 3 | 2.0 | 0.13 | 22.1 | Greater than 2 but less than 15. |
| 4 | 3.3 | 0.34 | 27.7 | 1. |
| 5 | 4.3 | 0.62 | 37.9 | 0.3.[1] |

[1] A rigid bond holding the glass pieces firmly together developed in one hour.

Results of these tests showed that the oxygenation in this case proceeded at a very rapid rate from the start. The final product, cooled to room temperature in a flow of oxygen and stored under aeration, consisted of a thin nonvolatile, nearly colorless and odorless fluid. The characteristics of this product were compared to those of the starting material to which in one case no catalyst had been added, and in another case where 1%, by weight, of tertiary butyl perbenzoate had been added. A small drop of each of these three fluid samples was placed between pairs of cover glasses and heated at 60° C. The observations made are given in Table II below.

*Table II*

| Test No. | Composition | Time Between Glass at 60° C. | Results |
|---|---|---|---|
| 1 | Anaerobic monomer | 8 min | Firm bond; a rigid, insoluble, infusible polymer formed. |
| 2 | Starting material with no catalyst. | 2 hrs | Still fluid. |
| 3 | Starting material plus 1% tertiary butyl perbenzoate. | 1 hr | Weak bond, soft polymer. |

When the time of oxygenation of the tetraethylene glycol dimethacrylate was extended to 5.7 hours, the anaerobic monomer formed was found to have a viscosity of 90 seconds at 25° C., and a gelation time between glass at 24° C. of about 15 minutes.

EXAMPLE 2

In this example 200 parts commercial grade tetraethylene glycol dimethacrylate known to contain an inhibitor of polymerization was placed in a flask fitted with an inlet tube for oxygen, a thermometer and a mechanical stirrer. After a continuous brisk flow of oxygen into the agitated fluid had been established, the latter was heated to 70° C. and held at 70-80° C. for about 5 hours. When the product was cooled to room temperature, it was found to have the same viscosity as the starting material and showed no tendency to polymerize during an 8-hour test carried out between glass slides at room temperature. The treatment of the polymerizable composition with oxygen again for a second 5-hour period at 73-75° C. still did not produce any noticeable change in either viscosity or polymerization characteristics. However, the addition of two parts of the anaerobic monomer, prepared from Example 1, to the polymerizable composition which had been treated for 10 hours with oxygen produced a marked change as evidenced by the fact that heating of the inhibited tetraethylene glycol dimethacrylate while oxygenating the latter for 4.4 hours at 70-80° C. gave an anaerobic monomer having a viscosity of 28.5 seconds at 25° C. as compared to 19 seconds initially, and a gelation time at 24° C. of 30 minutes as compared with more than 22 hours by the original material. At 60° C. the gelation time was less than 5 minutes. These facts show oxygenation occurred to a considerable extent during this third heating period using anaerobic monomer as the promoter.

The above-identified Example 2 was repeated with the exception that the anaerobic monomer was added to the polymerizable composition at the beginning of the heating and oxygenation steps. After 6 hours' heating at 73-77° C. a product was obtained which had approximately twice the viscosity of the starting material and a gelation time of 20 minutes between glass at 25° C.

EXAMPLE 3

In this example a commercial grade (containing a polymerization inhibitor) of tetraethylene glycol dimethacrylate which could not be oxygenated when subjected to oxygenation for a period of 2.3 hours at 78-79° C., was mixed with about 0.05 per cent, by weight, benzoyl peroxide and this mixture oxygenated for 2.3 hours at 75-77° C. with vigorous stirring. The product was cooled to room temperature in an atmosphere of oxygen. In contrast to the product of the first run (viscosity 19 seconds), the new product had a viscosity of 33 seconds at 24° C. and a gelation time between glass slides at 24° C. of approximately 1 hour.

When Example 3 was repeated with the exception that the benzoyl peroxide content was increased to 1%, by weight, it was found that after 2.4 hours of oxygenation at 75-79° C., the product had a gelation time between glass slides at 24° C. of 30 minutes. The viscosity during oxygenation increased from 19 to 45 seconds.

That the acquired ability of the oxygen-treated polymerizable material to undergo rapid polymerization at room temperature in the absence of air was not due to the direct action of the added peroxide, but rather was due solely to the starting material having undergone oxygenation, was clearly substantiated by the following tests. A solution of 1%, by weight, benzoyl peroxide in the non-oxygenated starting tetraethylene glycol dimethacrylate was placed between glass slides and allowed to stand at 24° C. Gelation occurred in about 5 hours in contrast to the 30 minutes for the oxygenated product in the preceding experiment. The results of similar comparative gelation tests with other concentrations of benzoyl peroxide and other types of peroxide added to the starting unoxygenated tetraethylene glycol dimethacrylate are given in the following Table III.

*Table III*

| Test No. | Composition | Gelation Time at 25° C. (Hours) |
|---|---|---|
| 1 | Anaerobic monomer (from Example 3). | 0.5. |
| 2 | Starting material (not oxygenated). | Greater than 27. |
| 3 | No. 2 plus 0.2% benzoyl peroxide. | Greater than 5, less than 27. |
| 4 | No. 2 plus 1% benzoyl peroxide. | About 5. |
| 5 | No. 2 plus 5% benzoyl peroxide. | Do. |
| 6 | No. 2 plus 1% ditertiary butyl diperphthalate. | Greater than 50. |
| 7 | No. 2 plus 1% tertiary butyl hydroperoxide. | Greater than 72. |

EXAMPLE 4

An anaerobic monomer was prepared in the same manner as described in Example 3 with the exception that 0.25%, by weight, tertiary butyl perbenzoate was dissolved in 200 parts commercial tetraethylene glycol dimethacrylate. After 4.4 hours of oxygenation at 77° to 81° C., the product was cooled under oxygen to room temperature and was found to have increased in viscosity from 19 to 45 seconds at 25° C. This fact showed that the material had undergone marked oxygenation during the period.

EXAMPLE 5

In a round-bottom flask equipped with an oxygen delivery tube at the bottom was placed 500 parts of tetraethylene glycol dimethacrylate, commercial grade, and 0.5 part ditertiary butyl diperphthalate. After a flow of oxygen adjusted to a constant rate of 90 cc. per minute had been established through the sample, the charge was heated to 70° C. and the temperature then held within the range of 69-72° C. A small sample taken after 3.5 hours heating was found to have a viscosity at 25° C. of about 29 seconds (initial value equal to about 19 seconds), a gelation time between glass slides at 28° C. of about 30 minutes (initial value greater than 22 hours), and an active oxygen content of about 0.4%. The anaerobic monomer formed in this manner was subjected to further oxygenation and such treatment continued for an additional 4.4 hours at around 69-72° C. and thereafter the product was again cooled to room temperature and a brisk flow of air substituted for oxygen. The product was found to have a viscosity at 25° C. of about 39 seconds, a gelation time between glass slides at 28° C. of about 20 minutes, and an active oxygen content of about 0.6%. Continued aeration of the anaerobic monomer at room temperature over a period of several weeks resulted in only a slight gradual increase in viscosity and active oxygen content. The unique polymerization characteristics initially displayed in the anaerobic monomer were still retained after this period of continuous aeration.

EXAMPLE 6

To illustrate that all compounds containing two terminal CH₂=C< groupings are not converted by oxygenation under conditions employed by us into anaerobic monomers, a small sample of diallyl phthalate, commercial grade essentially inhibitor-free, was subjected to the conditions of oxygenation as described in Example 1. After 7.3 hours' heating at 72–76° C. in contact with oxygen, the product was cooled to room temperature while still being subjected to the flow of oxygen. Viscosity measurements showed that no increase in viscosity had occurred during the heating period and a gelation test conducted between glass slides at room temperature for 8 days showed that this product would not polymerize in this length of time. Treatment of the diallyl phthalate containing 0.1%, by weight, benzoyl peroxide with oxygen under the the same conditions as above for 4.4 hours at about 75° C. again gave negative results with regard to viscosity increase and gelation tests.

EXAMPLE 7

As was pointed out previously, the anaerobic monomers can only be obtained by treatment of particular starting materials. This example illustrates the effect of treating different types of polymerizable starting materials containing a single CH₂=C< grouping and free of an ether linkage. More particularly, styrene, n-butyl acrylate, and methyl methacrylate containing 1%, by weight, ditertiary butyl diperphthalate were subjected to oxygenation employing the same reaction vessel and essentially the same procedure as was used in the preceding examples. The following table shows the conditions under which oxygenation of each polymerizable monomer was conducted and also the results of tests carried out on the product which was obtained as a result of such oxygen treatment.

| | Monomer | Styrene | n-Butyl Acrylate | Methyl Methacrylate |
|---|---|---|---|---|
| (a) | Promoter added [di-(t-butyl) diperphthalate]. | 0.1% | 0.1% | 0.1%. |
| (b) | Time of oxygenation (hours) | 3.5 | 6.3 | 6.8. |
| (c) | Bath temp. (°C.) | 70–90 | 78–90 | 85–90. |
| (d) | Viscosity (sec. at 25–26° C.): | | | |
| | initial charge | 3.7 | 3.7 | 3.3. |
| | product | 5.0 | 3.7 | 3.5. |
| (e) | Active oxygen content (percent): | | | |
| | initial charge [1] | 0.01 | 0.01 | 0.01. |
| | product | 0.43 | 0.11 | 0.62. |
| (f) | Hardening time (hours between glass slides at 25° C.). | Greater than 48 | Greater than 168 | Greater than 144. |

[1] Calculated on the basis of promoter added.

In the three cases above, although treatment with oxygen at the elevated temperatures resulted in the formation of a liquid product possessing appreciable active oxygen, still they did not harden after many hours standing between glass slides at room temperature. In fact, the test samples were only slightly thicker than they were at the beginning of the test. It can therefore be concluded that the treatment of the above three monomers with oxygen at about 80° C. did not produce products having anaerobic characteristics.

EXAMPLE 8

A small sample of pentamethylene glycol dimethacrylate

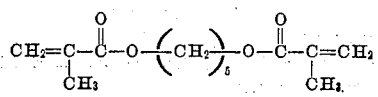

was subjected to oxygenation under the same conditions as described in Example 6 with the exception that the heating was for 5 hours at 75–78° C. in a current of oxygen. Thereafter, the product was cooled to room temperature and tested. The viscosity was found to be essentially the same as the original monomeric material and gelation tests showed the material failed to polymerize at room temperature during an 8-day period. When about 0.5%, by weight, benzoyl peroxide was added to a fresh sample of the pentamethylene glycol dimethacrylate and the material oxygenated under the same conditions as described above, the same negative results were obtained. These facts indicate that pentamethylene glycol dimethacrylate, even though it is somewhat similar to the ether dimethacrylates employed in the practice of our invention, does not undergo oxygenation under the specified conditions to produce a new composition having the unusual properties exhibited by an anaerobic monomer. This illustrates the necessity for having ether linkages present in the starting materials.

EXAMPLE 9

Essentially pure diethylene glycol dimethacrylate (boiling point 123–125° C. at 0.8 mm.) was mixed with about 0.1%, by weight, ditertiary butyl diperphthalate as oxygenation promoter. This mixture was placed in a long narrow vessel fitted with an oxygen delivery tube extending to the bottom of the tube. After a brisk current of oxygen had been established through the charge, the tube was heated in a water bath at a temperature of about 80–90° C. for varying lengths of time while removing samples periodically and testing them to determine the viscosity, gelation time and active oxygen present. The following table shows the results of such periodic examinations of the oxygenated diethylene glycol dimethacrylate.

*Table IV*

| Total Time of Oxygenation (Hours) | Viscosity (Seconds at 25° C.) | Gelation Time at 25° C. | Percent Active Oxygen |
|---|---|---|---|
| 0.0 | 9 | Greater than 7 days | 0.1 |
| 2.5 | 12 | 145 minutes | 0.4 |
| 4.0 | 21 | 140 minutes | 0.7 |
| 5.0 | 24 | 60 minutes | 1.1 |

The above-identified finally oxygenated diethylene glycol dimethacrylate (1.1 per cent active oxygen) when aerated for two weeks at room temperature did not appear to undergo any noticeable change.

EXAMPLE 10

A sample of dipropylene glycol dimethacrylate containing 0.1%, by weight, ditertiary butyl diperphthalate was treated with oxygen for 6 hours at 83–87° C. in the manner described in Example 9. After cooling the product under oxygen flow it was found to have a viscosity at 25° C. of about 40 seconds (initial value 5.76 seconds), a gelation time at 25° C. of around 45 minutes, and active oxygen equal to about 1.1%.

EXAMPLE 11

Tetraethylene glycol diacrylate, prepared by effecting reaction between methyl acrylate and tetraethylene glycol, was mixed with 0.1%, by weight, ditertiary butyl diperphthalate as an oxygenation promoter and thereafter placed in a vessel fitted with an oxygen delivery tube extending to the bottom of the vessel. After a brisk current of oxygen had been established through the charge, the vessel was heated in a water bath to about 80° C. Oxygenation was continued for a total of 12 hours during which time samples were removed periodically and evaluated. The results of these evaluations are summarized in the following table:

Table V

| Total Time of Oxygenation (Hours) | Bath Temperature (° C.) | Viscosity (Sec. at 25° C.) | Gelation Time (Hrs. at 25° C.) | Active Oxygen Percent |
|---|---|---|---|---|
| 0 | | 19 | Greater than 48 | 0.01 |
| 5 | 78–82 | 29 | 2.5 | 0.09 |
| 8 | 79–83 | | 1.75 | |
| 10 | 77–85 | 49 | 1.3 | 0.37 |
| 12 | 75–85 | 75 | 1.0 | 0.59 |

The above data shows that an anaerobic monomer was produced after 12 hours oxygenation under the conditions stipulated above. The product was aerated at room temperature for one week without undergoing noticeable change in viscosity.

EXAMPLE 12

This example illustrates the effect of oxygenating a polyethylene glycol dimethacrylate in which the number of —CH$_2$—CH$_2$—O— groupings is a high number. To prepare such a dimethacrylate, two parts, by weight, polyethylene glycol (commercial grade of Carbowax "1000" having a freezing point of 36–37° C. and average molecular weight of 1000) and one part, by weight (137% excess), methacrylyl chloride were mixed together in a reaction flask fitted with a reflux condenser. This reaction mixture was heated to 80° C. for 0.5 hour during which time HCl was liberated. Heating was continued for 2 hours at 93–98° C. to assure complete reaction. The crude product was evacuated for 1 hour to remove excess methacrylyl chloride and residual HCl. The product polyethylene glycol dimethacrylate was a water-soluble, pale yellow, somewhat viscous liquid.

A sample of the polyethylene glycol dimethacrylate prepared above containing no promoter was treated with oxygen for two hours at 80–86° C. in the manner described in Example 9. After cooling the product under oxygen flow, it was found to have a gelation time between glass slides at 25° C. of about 45 minutes, between copper strips of about 10 minutes, between steel strips about four minutes, and it possessed about 0.5 per cent active oxygen.

EXAMPLE 13

This example shows that an oxygenated composition having the unique properties of an anaerobic monomer can be produced by replacing a major part of the polyethylene glycol dimethacrylate with a polyethylene glycol monomethacrylate, and subjecting the mixture of di- and mono-esters to the conditions of oxygenation described by this invention. More particularly, a mixture comprising tetraethylene glycol dimethacrylate, and tetraethylene glycol monomethacrylate, in the ratio of approximately 1:2, by weight, was oxygenated with a stream of oxygen for about 4 hours at 75–82° C. as outlined in Example 9 using ditertiary butyl diperphthalate. The resulting light brown oxygenated liquid, after cooling under oxygen flow, had a gelation time between glass slides at 25° C. of about 1 hour (initial value greater than 42 hours), and about 0.3% active oxygen.

EXAMPLE 14

This example illustrates the separate oxygenation of two dimethacrylates in which ether linkages intermediate the methacrylic acid residues are absent. To ethylene glycol dimethacrylate (boiling point around 88–89° C. at 10 mm.) and pentamethylene glycol dimethacrylate (see also Example 8), respectively, was added 0.1%, by weight, ditertiary butyl diperphthalate.

After heating the ethylene glycol dimethacrylate under continuous oxygen flow for 9 hours at 82–92° C., the product was cooled under oxygen. The oxygen-treated starting material was found to have a viscosity at 25° C., of about 6.8 seconds (initial value approximately 7.0 seconds), a gelation time between glass slides at 25° C. greater than 24 hours, and an active oxygen content of about 0.03%.

The sample of pentamethylene glycol dimethacrylate also containing the ditertiary butyl diperphthalate was treated with oxygen at 80° C. according to the procedure employed in Example 8 with the results summarized in Table VI below.

Table VI

| Sample No. | Total Time Oxygenation (Hours) | Viscosity (Seconds) at 25° C.) | Gelation Time at 25° C. (Hours) | Percent Active Oxygen |
|---|---|---|---|---|
| 1 | 0.0 | 9.1 | Greater than 72. | Trace. |
| 2 | 5.5 | 9.5 | Greater than 48. | 0.17 |

The results described in Example 14 demonstrate again that a dimethacrylate ester of a glycol free of ether linkages will not yield a product having properties comparable to those in which there are ether linkages.

EXAMPLE 15

This example illustrates the effect of treating with oxygen a monomethacrylate containing ether linkages. More particularly, beta-(beta'-ethoxyethoxy) ethyl methacrylate

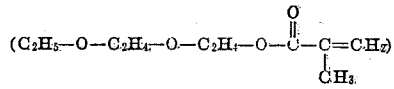

was prepared by effecting reaction between 10 parts freshly distilled diethylene glycol monoethyl ether (boiling point 193.0–193.3° C. at 753 mm.) and about 10 parts, by weight (about 28% excess), of methacrylyl chloride. The reaction mixture was heated at 76° C. for 30 minutes until HCl evolution had subsided, and further heated for three hours at 97° C. to insure complete reaction. The excess methacrylyl chloride and residual HCl were removed by vacuum distillation and the residue fractionally distilled to give a water-white distillate boiling at about 0.2 mm. within the range of 60-90° C. which comprised the methacrylate ester of diethylene glycol monoethyl ether.

The above prepared monomethacrylate was treated with oxygen for 7.5 hours at a temperature of 81-90° C. in the same manner as set forth in Example 8. The water-white liquid product was cooled under continued oxygen flow at room temperature and tested. It was found that the product had a viscosity at 25° C. of about 12.1 seconds (initial value 7.7 seconds), gelation time of about 6 hours, and about 0.8% oxygen. These results show that even though an oxygenated, polymerizable compound may possess a substantial amount of active oxygen, this does not necessarily mean that it will undergo rapid polymerization at room temperature merely by virtue of its high content of active oxygen. In contrast to the above result, as shown in many of the preceding examples, an anaerobic monomer prepared by oxygenating an ether methacrylate containing two methacrylate groups in the starting material will undergo rapid polymerization at room temperature in the absence of air, forming a gel structure within an hour's time, and thereafter will solidify to a rigid polymer within a relatively short period.

EXAMPLE 16

Diglycerol was prepared by heating 400 parts of vacuumed-distilled glycerol with 20 parts anhydrous sodium sulfate under nitrogen atmosphere at 250° C. for 7.5 hours. The reaction product was thereafter vacuum-distilled under reduced pressure to obtain diglycerol as a fraction boiling at 220° C. at 1 mm. This product, which was a viscous, pale yellow liquid, was completely miscible in water and had a refractive index, $n_D^{20}$ 1.4890, which is essentially the same as that disclosed in the literature.

Five parts of the above prepared diglycerol were placed in a round-bottomed flask fitted with a reflux condenser together with 17 parts freshly-distilled methacrylyl chloride (B. P. 97-98° C.). The mixture was heated for 2.5 hours in a 90° C. water bath. During the reaction the mixture was shaken frequently to facilitate mixing. At the end of the reaction the excess methacrylyl chloride and residual HCl were removed by the use of a vacuum to leave the product, diglycerol tetramethacrylate, which was a viscous, pale yellow liquid, soluble in benzene and in acetone, but insoluble in water, and having a refractive index, $n_D^{20}$ 1.4713. About 2 parts of the diglycerol tetramethacrylate were placed in a tube fitted with an oxygen delivery tube extending to the bottom of the tube. Oxygen was bubbled through the diglycerol tetramethacrylate for about 3 hours at a temperature of about 75-80° C. The contents of the tube were then cooled to room temperature and the flow of oxygen replaced by air. The oxygenated product was a pale yellow liquid having a viscosity at 25° C. of about 15 minutes (initial value was 3.8 minutes) and an active oxygen content of 0.12% (initial value 0%). The gelation time between glass slides at 25° C. was 30 minutes, whereas the initial time on the starting material prior to oxygenation was greater than 48 hours.

EXAMPLE 17

This example illustrates the effect of oxygenating with ozone. More particularly, tetraethylene glycol dimethacrylate was subjected to treatment with ozone by passing ozonized oxygen (containing about 2% $O_3$, by volume) through the liquid tetraethylene glycol dimethacrylate at room temperature for 25 minutes. Test indicates that during the ozonization process all the ozone was being absorbed by the tetraethylene glycol dimethacrylate. At the end of this time the viscosity was measured by the procedure outlined previously and found to be about 28 seconds at 25° C. (initial value about 19 to 22 seconds). A sample of the ozone-treated material when tested for gelation between glass slides at 25° C., showed that it gelled within 45 minutes, whereas prior to treatment with the ozone the time for gelation was greater than 24 hours. Although the time for gelation was somewhat greater than that of tetraethylene glycol dimethacrylate treated with oxygen at an elevated temperature to an essentially equivalent active oxygen content, nevertheless, the use of ozone has the advantage that preparation of anaerobic monomers can take place at room temperature, at which temperature danger of run-away reactions is less than at elevated temperature.

EXAMPLE 18

As pointed out above, in the preparation of anaerobic monomers it is essential that the following conditions be maintained:

(a) Flow of oxygen must be adequate and continuous
(b) Stirring must be rapid
(c) The temperature should not exceed approximately 90°, and
(d) The oxygenated product must be cooled to room temperature under oxygen flow with stirring.

Failure of any of these requirements results in almost immediate gelation of the product accompanied by the sudden generation of a large quantity of heat. Such an event would obviously be particularly troublesome when preparing large batches of an anaerobic monomer.

In this connection it was found possible to produce an anaerobic monomer by carrying out the oxygenation of the starting material in a water emulsion. This production technique eliminates any danger that if, for any reason, the reaction should get out of control, the insoluble, infusible polymer, which then will form, will be obtained in the form of beads, which can be readily removed from the vessel. In contrast to this, if a non-aqueous system is used, the polymer formed when the reaction goes out of control is a solid, infusible, insoluble, product tenaciously adherent to the walls of the reaction vessel and difficult and expensive to remove.

In a round-bottom flask fitted with an oxygen delivery tube attached to the bottom of the flask and a high speed mechanical stirrer, was placed a charge consisting of 5000 parts water, 2000 parts tetraethylene glycol dimethacrylate, and 2 parts di-(tertiary butyl) diperphthalate. The starting material emulsified readily with the water and no special emulsifying agents were required though they could have been used if desired. After adjusting the rate of flow of oxygen to the desired level, the stirrer was started and the charge heated to 80-83° C. for 5.3 hours. During this oxygenation period, the reaction mixture had the appearance of a milky suspension. The oxygenated product was cooled to room temperature under oxygen flow. Upon arresting the stirrer, the milky mixture rapidly separated to two layers within a very short period of time. The lower layer comprising the anaerobic monomer was drawn off in a separatory funnel and promptly placed under aeration at room temperature. Within a few hours the slight turbidity of this product (residual water) had disappeared leaving a clear, pale yellow liquid. Evaluation of this latter liquid showed that it had a viscosity at 26° C. of 25.5 seconds (initial value 13 seconds), a gelation time between glass slides at 26° C. of about 22 minutes, and an active oxygen content of 0.75%.

To illustrate what would happen if the reaction went out of control during emulsion oxygenation, the above example was repeated in detail with the exception that the temperature of the reaction was allowed to climb gradually from 80° C. during oxygenation in order to invite gelation. When, after 3 hours oxygenation, the temperature had risen to 90° C., the product suddenly gelled. Instead of forming a solid cake and soaring to a high temperature in the case of a non-aqueous system, the product was transformed into small beads of polymers (particles about 1/8" diameter) while at the same time there was no evidence of heating. Furthermore, stirring was not interrupted as a result of the gelation and the contents of the reaction vessel could be easily removed.

The storage of the above-prepared anaerobic monomers requires little attention as long as continuous aeration is employed throughout the anaerobic monomer. By means of this technique, it is possible to maintain the material in an active fluid condition at room temperature over long periods of time until such time as it is required to utilize the same in applications. As pointed out previously, it is desirable that the air or oxygen be thoroughly dispersed throughout the liquid anaerobic monomer. This may be accomplished either with the aid of an effective mechanical stirrer without the need of injecting an air stream into the liquid, or by bubbling air through it in such a manner that the entire liquid body becomes permeated with minute air bubbles that will be carried around the vessel by convection currents.

It has been found that as the temperature of the anaerobic monomer is lowered, the requirement for necessary amounts of oxygen or air become progressively less. At temperatures around 0° C. an anaerobic monomer initially saturated with air can be stored in bulk without further aeration for several hours to a day or two before it sets up to a gel. At Dry Ice temperatures (—78° C.), the oxygen demand is so minute that the storage life without aeration becomes quite long. Refrigeration in Dry Ice therefore provides a ready means for transporting an anaerobic monomer without substantial danger of premature gelation. However, at room temperature the oxygen requirement is such that continuous aeration must be provided in order that the material be maintained in a fluid condition. We have found that the optimum condition for storage under aeration is around a temperature of about 20° C. A prolongation of the useful shelf life of the anaerobic monomer may be accomplished by the addition of unoxygenated starting material in such quantities as will restore the original viscosity. However, the gelation time of the stored product conditioned in this manner is usually somewhat shorter than the original freshly prepared material.

In storing anaerobic monomers, it is also desirable to exclude sunlight as much as possible from the monomer. It has been found that storage in dark places away from the direct rays of the sun is particularly effective. Another consideration which has to be taken into account is that the surfaces immediately in contact with the anaerobic monomer may have an effect on the ease with which the monomer may set up or polymerize undesirably. Glass has been found to be the least innocuous. However, certain metals, particularly iron and copper, exert an accelerating effect on the cure of anaerobic monomers in the presence of air oxygen and, therefore, such metals should be avoided in the manufacturing and storage equipment.

As pointed out previously, the unique feature of our new anaerobic monomers, that is, our oxygenated compositions of matter lie in their readiness to undergo polymerization at room temperatures as soon as air is excluded without the need of added polymerization accelerators. The physical characteristics of the anaerobic monomers and of the polymerized products prepared therefrom make them especially useful in many applications where other materials are of little value. Thus, the anaerobic monomers claimed and disclosed herein are non-volatile, low-viscosity liquids with high penetrating power. On spontaneous polymerization at room temperature, they yield infusible, insoluble solids characterized by high mechanical strength and toughness, and a satisfactory degree of flexibility, particularly in thin sections. These anaerobic monomers are particularly valuable in adhesive and sealing applications where it is possible to take full and appropriate advantage of their unusual combination of properties.

Thus, it is possible to bond glass to glass as is illustrated in the foregoing examples, particularly when the glass surfaces are etched or sand blasted. In addition, it has been found highly advantageous to employ our anaerobic monomers in bonding various metal surfaces together. Thus, it has been found that it is possible to bond iron or copper surfaces to each other or to other surfaces, using, for instance, oxygenated tetraethylene glycol dimethacrylate by merely coating the bare iron or copper surfaces and placing them together, thus excluding air at room temperature and permitting them to set at this temperature for a period of time ranging from about 1 to 7 hours. At the end of this time it is found that the bond produced has such strength that the pieces cannot be separated by the fingers. Gelation of the anaerobic monomer between the metallic surfaces is greatly accelerated and in some instances is about half of that required to obtain the same degree of gelation as when the surfaces adjacent the anaerobic monomer comprises glass. In addition, it has also been found in the case of adhering copper surfaces that no greening of the copper surfaces is caused by the use of these anaerobic monomers. In contrast to this, when the unoxygenated monomer containing certain polymerization initiators, e. g., benzoyl peroxide, is heated between copper surfaces at elevated temperatures for a sufficient time to effect polymerization of the unoxygenated monomer, it is often found that the copper is attacked as evidenced by a corrosive green color on the surface of the copper which usually inhibits polymerization.

It will, of course, be apparent to those skilled in the art that instead of conducting the final polymerization during the exclusion of air of the anaerobic monomer for adhesive purposes at room temperature, it is possible to use elevated temperatures of the order of from about 60 to 100° C., or higher, e. g., up to 150° C. Thus, in the case of adhering glass surfaces in the absence of air using, for example, tetraethylene glycol dimethacrylate, it was found that only 5 minutes at 60° C. were required to effect a complete cure of the anaerobic monomer, and about 10 seconds were required at about 100° C. to effect the same cure. On metal surfaces exerting an accelerating action, the corresponding times will be still shorter.

Our claimed anaerobic monomers have assorted and novel applications. They may be used to seal or bond various objects whereby water-resistant and substantially heat-resistant seals are obtained. Thus, it is possible to bond glass lens to various metals, to attach rotors to shafts, to seal protective casings around delicate mechanisms as, for instance, sealing a plastic or metal or glass case around a clock mechanism, or plastic covers onto steel magneto cases, etc.

In addition, the claimed compositions of matter can be used as leak sealants. The fluid materials can be applied to a joint or a place where a leak is indicated and because of their fluidity and substantial stability in the presence of air or oxygen can be readily pulled into crevices or pores by a vacuum. In the pores or crevices, due to the absence of air, the anaerobic monomer is almost spontaneously converted into a hard, heat-resistant and solvent-resistant solid which effectively seals the opening. In some cases it may not be necessary to use a vacuum as adequate wetting action is obtained whereby capillary action alone will suffice to fill the pores without the need of a vacuum.

More specific application of the anaerobic monomers as leak sealants involves using them in sealing devices under vacuum or pressure where it is desired to obviate tiny leaks; cracks in porcelain can be eliminated by means of the anaerobic monomer; leaks in vinyl coatings may be sealed as well as leaks in brass tubing. Threaded connections and set screws can be made substantially permanently immovable by coating the connection or screws with small amounts of anaerobic monomer prior to joining the connections or inserting the screws. In many instances, the use of anaerobic monomers obviates the necessity for using lock washers.

The greatest use which appears to be particularly adaptable for the anaerobic monomer is for adhesives for various surfaces. The bond obtained is strong, solvent-resistant and heat-resistant. When used to bond glass to glass, the bonding is optically clear and does not interfere with the view through the glass at the bonded point. Strong glass-to-metal and metal-to-metal seals may be obtained. The ability to form strong metal-to-metal seals is especially helpful in the case of cementing metal laminations used in transformers. In the latter instance, it is only necessary to coat the individual laminations and superimpose one upon the other and heat the total assembly or even permit it to remain at room temperature in order to obtain a strong bond. Our anaerobic compositions have a certain advantage over other resinous materials used for bonding or laminating purposes in that whereas other resins tend to either polymerize or dry or harden when exposed to air, thus requiring fast action with regard to making the laminated assembly, laminations coated with the anaerobic monomer can be allowed to remain exposed to the air without such danger. This is due to the fact that when the anaerobic monomer is applied as a thin film, air diffuses through the film readily to keep the anaerobic monomer from polymerizing over an extended period of time. Therefore, there is no need for haste to join the coated surfaces together. It is only when the laminations are superimposed on each other and air is excluded that bonding and curing of the anaerobic monomer is effected. It will, of course, be apparent that other material, for example, steel, nickel, copper, etc. may be adhered to each other or to other surfaces by means of our anaerobic composition.

It will be apparent that the anaerobic monomers or oxygenated monomers described above comprise new polymerizable compositions of matter which are entirely different as far as their structure and properties are concerned from the starting materials. As compared to the prior art disclosures where it is desired that high yields of the pure monomer be obtained in which little, if any, chemical combination with oxygen is desired, it is our purpose to effect chemical combination of the oxygen with the starting polymerizable materials. As a matter of fact, our claimed anaerobic monomers comprise products possessing a high active oxygen content. The presence of oxygen in our anaerobic monomers can be determined quite accurately and such determinations will conclusively establish that a novel composition of matter entirely different from the starting material has been obtained as a result of our process of effecting oxygenation of the starting material.

What we claim as new and desire to secure by Letters Patent of the United States is:

1. A composition of matter obtained by oxygenating to a final active oxygen content of at least 0.1% a compound corresponding to the general formula:

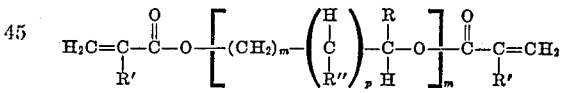

where R is a member selected from the class consisting of hydrogen, —$CH_3$, —$C_2H_5$, —$CH_2OH$,

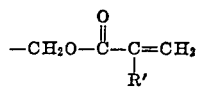

R' is a member selected from the class consisting of hydrogen, chlorine, —$CH_3$, and —$C_2H_5$, R'' is a member selected from the class consisting of hydrogen, —OH, and

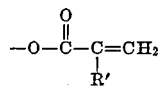

$m$ is an integer equal to at least 1, $n$ is an integer equal to at least 2, and $p$ is one of the following: 0, 1.

2. An oxygenated monomer obtained by passing oxygen at a temperature above 25° C. through a compound corresponding to the general formula:

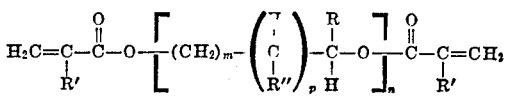

where R is a member selected from the class consisting of hydrogen, —CH₃, —C₂H₅, —CH₂OH,

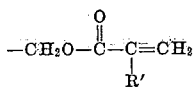

R' is a member selected from the class consisting of hydrogen, chlorine, —CH₃, and —C₂H₅, R'' is a member selected from the class consisting of hydrogen, —OH, and

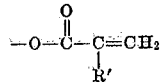

m is an integer equal to at least 1, n is an integer equal to at least 2, and p is one of the following: 0, 1, said passage of oxygen being conducted until the final active oxygen content of the compound is between 0.1 and 1.5 per cent.

3. A composition of matter comprising polyethylene glycol dimethacrylate containing at least 0.1% combined final active oxygen.

4. A composition of matter comprising tetraethylene glycol dimethacrylate containing at least 0.1% combined final active oxygen.

5. A composition of matter comprising diethylene glycol dimethacrylate containing at least 0.1% combined final active oxygen.

6. A composition of matter comprising dipropylene glycol dimethacrylate containing at least 0.1% combined final active oxygen.

7. A composition of matter comprising tetraethylene glycol diacrylate containing at least 0.1% combined final active oxygen.

8. A process which comprises passing oxygen through a compound corresponding to the general formula:

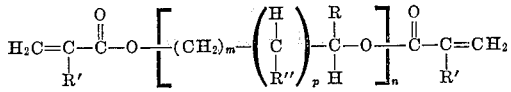

where R is a member selected from the class consisting of hydrogen, —CH₃, —C₂H₅, —CH₂OH,

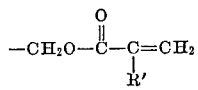

R' is a member selected from the class consisting of hydrogen, chlorine, —CH₃, and —C₂H₅, R'' is a member selected from the class consisting of hydrogen, —OH, and

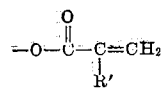

m is an integer equal to at least 1, n is an integer equal to at least 2, and p is one of the following: 0, 1, the said passage of oxygen being conducted until the compound has a final active oxygen content of at least 0.1%.

9. The process which comprises passing oxygen through polyethylene glycol dimethacrylate while maintaining the temperature of the latter above 25° C., the said passage of oxygen being conducted until the said dimethacrylate has a final active oxygen content of at least 0.1%.

10. The process which comprises passing oxygen through tetraethylene glycol dimethacrylate while maintaining the temperature of the latter above 25° C., the said passage of oxygen being conducted until the said dimethacrylate has a final active oxygen content of at least 0.1%.

11. The process which comprises passing oxygen through diethylene glycol dimethacrylate while maintaining the temperature of the latter above 25° C., the said passage of oxygen being conducted until the said dimethacrylate has a final active oxygen content of at least 0.1%.

12. The process which comprises passing oxygen through dipropylene glycol dimethacrylate while maintaining the temperature of the latter above 25° C., the said passage of oxygen being conducted until the said dimethacrylate has a final active oxygen content of at least 0.1%.

13. The process which comprises passing oxygen through tetraethylene glycol diacrylate while maintaining the temperature of the latter above 25° C., the said passage of oxygen being conducted until the said diacrylate has a final active oxygen content of at least 0.1%.

14. The process of polymerizing a compound corresponding to the general formula:

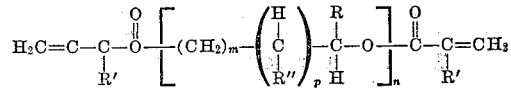

where R is a member selected from the class consisting of hydrogen, —CH₃, —C₂H₅, —CH₂OH,

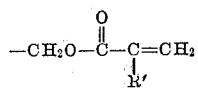

R' is a member selected from the class consisting of hydrogen, chlorine, —CH₃, and —C₂H₅, R'' is a member selected from the class consisting of hydrogen, —OH, and

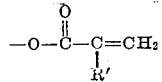

m is an integer equal to at least 1, n is an integer equal to at least 2, and p is one of the following; 0, 1, which process comprises (1) passing oxygen through the aforesaid compound at a temperature above 25° C. until at least 0.1% final active combined oxygen is introduced into the compound, and (2) thereafter excluding oxygen from the oxygenated compound to effect polymerization thereof.

15. The process of polymerizing polyethylene glycol dimethacrylate which comprises (1) passing oxygen through the aforesaid compound at a temperature above 25° C. until at least 0.1% final active combined oxygen is introduced into the compound, and (2) thereafter excluding oxygen from the oxygenated compound to effect polymerization thereof.

16. The process of polymerizing tetraethylene glycol dimethacrylate which comprises (1) passing oxygen through the aforesaid compound at a temperature above 25° C. until at least 0.1% final active combined oxygen is introduced into the compound, and (2) thereafter excluding oxygen from the oxygenated compound to effect polymerization thereof.

17. The process of polymerizing diethylene glycol dimethacrylate which comprises (1) passing oxygen through the aforesaid compound at a temperature above 25° C. until at least 0.1% final active combined oxygen is introduced into the compound, and (2) thereafter excluding oxygen from the oxygenated compound to effect polymerization thereof.

18. The process of polymerizing dipropylene glycol dimethacrylate which comprises (1) passing oxygen through the aforesaid compound at a temperature above 25° C. until at least 0.1% final active combined oxygen is introduced into the compound, and (2) thereafter excluding oxygen from the oxygenated compound to effect polymerization thereof.

19. The process of polymerizing tetraethylene glycol diacrylate which comprises (1) passing oxygen through the aforesaid compound at a temperature above 25° C. until at least 0.1% final active combined oxygen is introduced into the compound, and (2) thereafter excluding oxygen from the oxygenated compound to effect polymerization thereof.

20. The process which comprises passing oxygen through a compound until a final active oxygen content of at least 0.1% is introduced into the compound, the latter corresponding to the general formula:

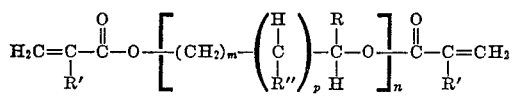

where R is a member selected from the class consisting of hydrogen, —CH₃, —C₂H₅, —CH₂OH,

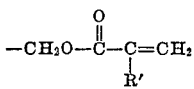

R' is a member selected from the class consisting of hydrogen, chlorine, —CH₃, and —C₂H₅, R'' is a member selected from the class consisting of hydrogen, —OH, and

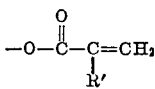

m is an integer equal to at least 1, n is an integer equal to at least 2, and p is one of the following: 0, 1, said compound containing a small amount of a peroxide as an oxygenation accelerator.

21. The process which comprises passing oxygen through polyethylene glycol dimethacrylate until the latter has a final active oxygen content of at least 0.1%, the latter compound containing a small amount of an organic peroxide as an oxygenation accelerator.

22. The process which comprises passing oxygen through tetraethylene glycol dimethacrylate until the latter has a final active oxygen content of at least 0.1%, the latter compound containing a small amount of an organic peroxide as an oxygenation accelerator.

23. The process which comprises passing oxygen through the diethylene glycol dimethacrylate until the latter has a final active oxygen content of at least 0.1%, the latter compound containing a small amount of an organic peroxide as an oxygenation accelerator.

24. The process which comprises passing oxygen through dipropylene glycol dimethacrylate until the latter has a final active oxygen content of at least 0.1%, the latter compound containing a small amount of an organic peroxide as an oxygenation accelerator.

25. The process which comprises passing oxygen through tetraethylene glycol diacrylate until the latter has a final active oxygen content of at least 0.1%, the latter compound containing a small amount of an organic peroxide as an oxygenation accelerator.

26. The process of forming an anaerobic monomer which comprises (1) forming a mixture of ingredients comprising (a) a compound corresponding to the general formula:

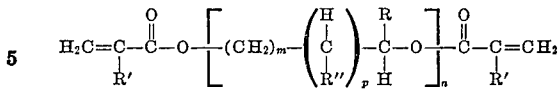

where R is a member selected from the class consisting of hydrogen, —CH₃, —C₂H₅, —CH₂OH,

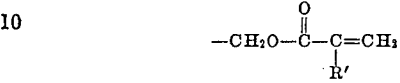

R' is a member selected from the class consisting of hydrogen, chlorine, —CH₃, and —C₂H₅, R'' is a member selected from the class consisting of hydrogen, —OH, and

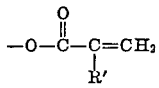

m is an integer equal to at least 1, n is an integer equal to at least 2, and p is one of the following: 0, 1, and (b) water, and (2) passing oxygen through the said mixture until the aforesaid compound has a final active oxygen content of at least 0.1% while maintaining the temperature thereof above 25° C.

27. The process of forming an anaerobic monomer which comprises (1) forming a mixture of ingredients comprising (a) a compound corresponding to the general formula

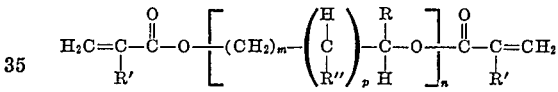

where R is a member selected from the class consisting of hydrogen, —CH₃, —C₂H₅, —CH₂OH,

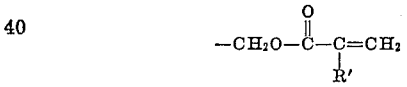

R' is a member selected from the class consisting of hydrogen, chlorine, —CH₃, and —C₂H₅, R'' is a member selected from the class consisting of hydrogen, —OH, and

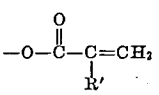

m is an integer equal to at least 1, n is an integer equal to at least 2, and p is one of the following: 0, 1, said compound containing a small amount of a peroxide as an oxygenation accelerator, and (b) water, and (2) passing oxygen through the said mixture until the aforesaid compound has a final active oxygen content of at least 0.1% while maintaining the temperature thereof at above 25° C.

28. The process for preparing an anaerobic monomer which comprises (1) forming a mixture of ingredients comprising (a) tetraethylene glycol dimethacrylate, (b) water, and (c) a small amount of an organic peroxide as an oxygenation accelerator, (2) emulsifying the mixture of ingredients described in (1), and (3) passing oxygen through the emulsified mixture for a time sufficient to increase the final active oxygen content of the tetraethylene glycol dimethacrylate above 0.1%, the said passage of oxygen being conducted while the temperature of the mixture is maintained above 25° C.

29. An article comprising contiguous surfaces bonded by a polymerized oxygenated compound having a final active oxygen content of at least 0.1% and corresponding to the general formula:

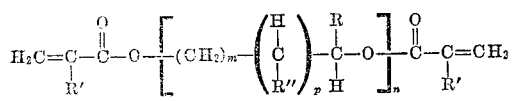

where R is a member selected from the class consisting of hydrogen, —CH₃, —C₂H₅, —CH₂OH,

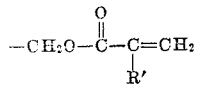

R' is a member selected from the class consisting of hydrogen, chlorine, —CH₃, and —C₂H₅, R'' is a member selected from the class consisting of hydrogen, —OH, and

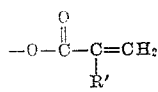

$m$ is an integer equal to at least 1, $n$ is an integer equal to at least 2, and $p$ is one of the following: 0, 1.

30. An article comprising contiguous surfaces bonded by polymerized oxygenated tetraethylene glycol dimethacrylate having a final active oxygen content of from 0.1 to 1.5 per cent.

31. A polymerized oxygenated compound having a final active oxygen content of at least 0.1 per cent and corresponding to the general formula

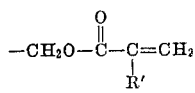

where R is a member selected from the class consisting of hydrogen, —CH₃, —C₂H₅, —CH₂OH,

—CH₂O—C(=O)—C(R')=CH₂

R' is a member selected from the class consisting of hydrogen, chlorine, —CH₃, and —C₂H₅, R'' is a member selected from the class consisting of hydrogen, —OH, and

—O—C(=O)—C(R')=CH₂

$m$ is an integer equal to at least 1, $n$ is an integer equal to at least 2, and $p$ is one of the following: 0, 1.

32. Polymerized oxygenated tetraethylene glycol dimethacrylate having a final active oxygen content of at least 0.1%.

ROBERT E. BURNETT.
BIRGER W. NORDLANDER.

REFERENCES CITED

The following references are of record in the file of this patent:

UNITED STATES PATENTS

| Number | Name | Date |
|---|---|---|
| 2,129,722 | Woodhouse | Sept. 13, 1938 |
| 2,198,373 | Bruson | Apr. 23, 1940 |
| 2,370,578 | Pollack et al. | Feb. 27, 1945 |
| 2,373,464 | Dittmar | Apr. 10, 1945 |
| 2,465,991 | Anderson et al. | Apr. 5, 1949 |

FOREIGN PATENTS

| Number | Country | Date |
|---|---|---|
| 549,234 | Great Britain | Nov. 12, 1942 |